Nov. 1, 1927. 1,647,751

C. A. SCHACHT

SCRAPER

Filed April 26, 1926

Inventor
Clifford A. Schacht
By Alexander & Dowell
Attorneys

Patented Nov. 1, 1927.

1,647,751

UNITED STATES PATENT OFFICE.

CLIFFORD A. SCHACHT, OF HUNTINGTON, INDIANA.

SCRAPER.

Application filed April 26, 1926. Serial No. 104,807.

This invention is a novel improvement in dish or sink scrapers and the like, and the principal object thereof is to provide a scraper having a flexible rubber blade and an integral reinforced rubber handle, the scraper being particularly adapted for use as a dish scraper, sink scraper, or the like.

Heretofore, scrapers have been used having flexible rubber blades, but the handles therefor have been made of metal, wood, or the like, attached to the blade by different methods and means, but such scrapers have been found unsatisfactory and unsanitary in that the handles eventually became loose or cut and tear the rubber blade, and moreover, it is almost impossible to keep the connection between the handle and the scraper free from dirt, grease, food, and other germ carrying mediums.

In my scraper, however, the handle and blade are molded simultaneously and integrally, the wire or other reinforcing material being inserted in the handle to stiffen same before molding. The major portion of the blade having no reinforcement, readily conforms to the shape or curvature of the article to be scraped, and since the handle and blade are molded in one piece, and the wire reinforcement is entirely embedded within the handle, there are no joints or connections between the handle and the blade wherein dirt, grease, food, etc., might lodge. Moreover, there are no screws, nails, or rivets for attaching the handle to the blade.

My scraper can be easily cleaned; and is inexpensive to manufacture, the article being practically finished when it comes from the mold.

I will explain the invention with reference to the accompanying drawing, which illustrates one practical embodiment thereof to enable others to adopt and use the same, and will summarize in the claims the novel features of construction, and novel combinations of parts, for which protection is desired.

In said drawing:—

Figure 1:
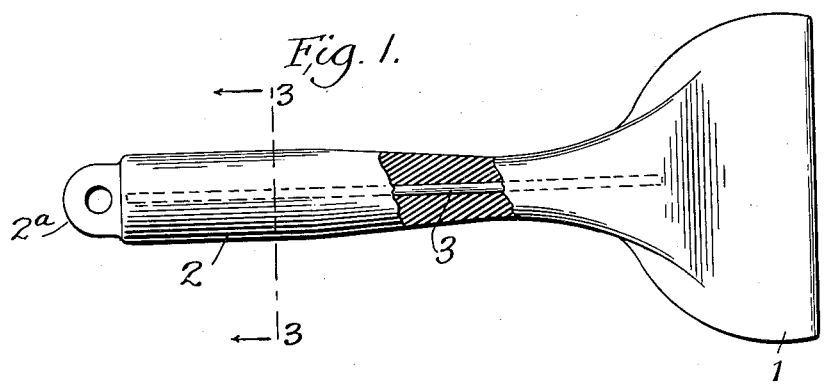
Figure 2:
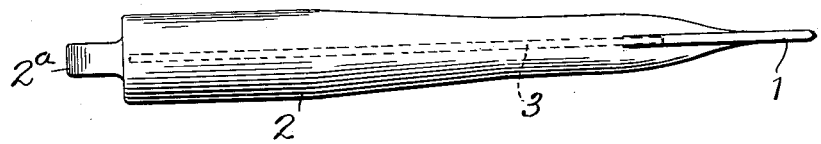
Figure 3:
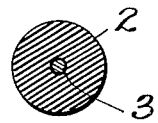

Fig. 1 is a front view of the scraper.
Fig. 2 is a side view thereof.
Fig. 3 is a section on the line 3—3 of Fig. 1.

As shown in the drawing, my novel scraper preferably comprises a rubber blade 1 slightly wedge-shaped or tapering from the portion adjacent the handle towards the blade edge; said blade being preferably semicircular as shown, but may be made in any other desired shape, to suit the particular requirements for which the scraper is to be used.

Extending from the rear or thickened end of the blade is an integral rubber handle 2, preferably circular in cross-section as shown, but may be of any other desired cross-section, such as square, rectangular, or elliptical. On the outer end of the handle 2 is an integral perforated ear $2^a$, whereby the scraper may be suspended from a cord, nail, or other support, when not in use. Handle 2 is preferably integrally molded simultaneously with the blade 1, and the handle and blade are formed during the same molding process, whereby the scraper will be practically finished when taken from the mold.

In order to give the handle 2 the required stiffness, a reinforcing member 3 which is preferably a length of stiff wire, or the like, is embedded in the handle before the molding process, the wire extending the full length of the handle from the ear $2^a$, and extending slightly into the thicker rear end of the blade 1. If desired, the reinforcing member 3 might be of any other desired material, or of any other desired cross-section; the reinforcing material or wire 3 being embedded in the handle before the molding process.

My novel dish scraper provides a one piece rubber scraper having an integral reinforced handle, and can be readily cleaned; is sanitary; and there are no joints or connections between the handle 2 and blade 1 wherein grease, dirt, or food may collect. Moreover, the scraper may be manufactured at a low cost, since the article is practically finished when it comes from the mold.

I do not limit my invention to the exact form shown in the drawing, for obviously changes may be made therein within the scope of the claims.

I claim:—

1. A scraper of the character specified, comprising a molded rubber blade, and an integral molded handle; and a reinforcing non-flexible member embedded in the handle, and extending partly through the blade.

2. A scraper of the character specified, comprising a molded rubber blade, having a scraping edge, said blade being thicker at its back portion than at its edge portion; an integral molded handle extending from the thicker portion of the blade at right angles to the scraping edge; and a reinforcing non-flexible member embedded in the handle.

3. A scraper of the character specified, comprising a molded rubber blade, having a scraping edge, said blade being thicker at its back portion than at its edge portion; an integral molded handle extending from the thicker portion of the blade at right angles to the scraping edge; a reinforcing non-flexible member embedded in the handle and extending into the back portion of the blade.

In testimony that I claim the foregoing as my own, I affix my signature.

CLIFFORD A. SCHACHT.